Patented Aug. 9, 1927.

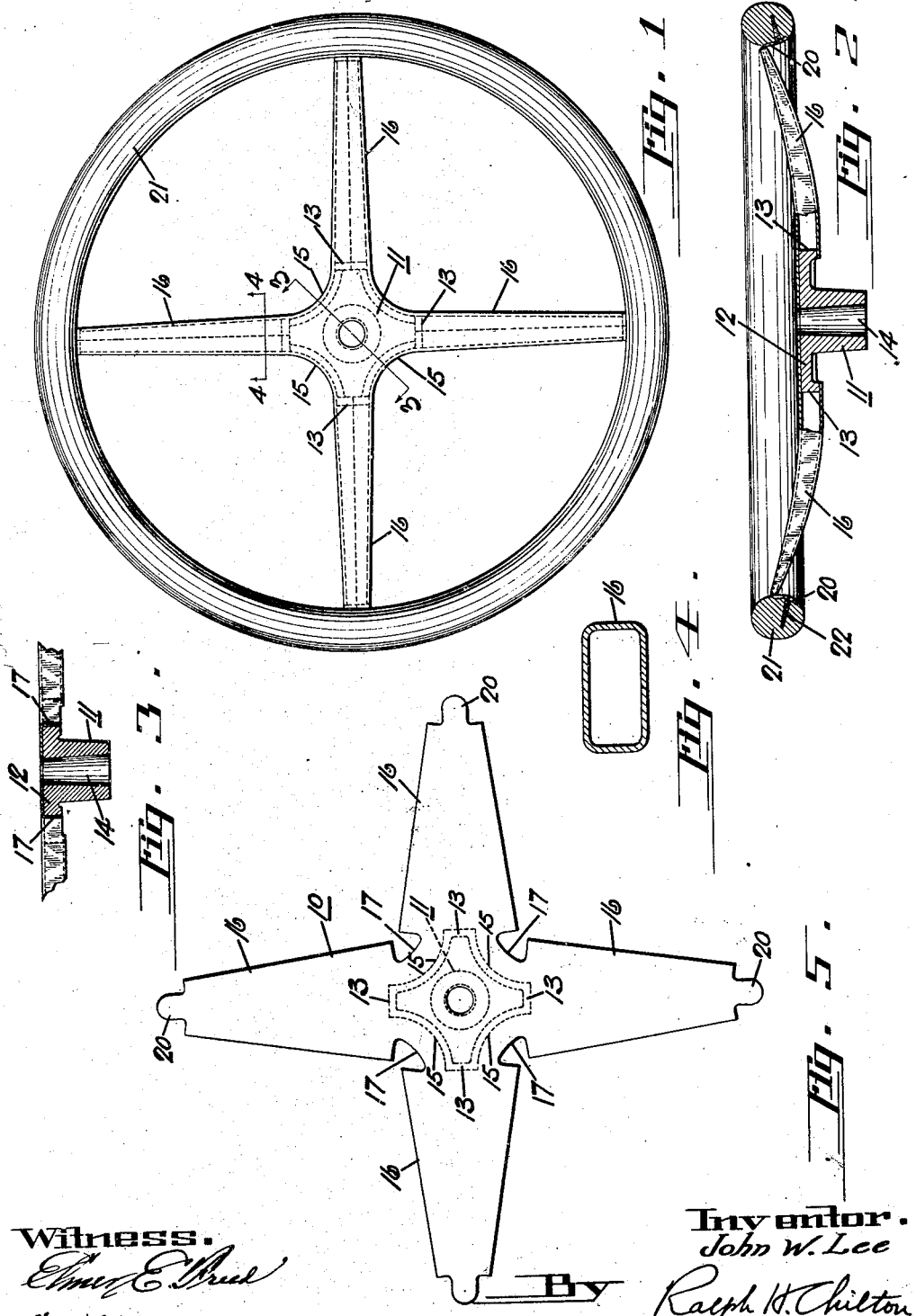

1,638,044

UNITED STATES PATENT OFFICE.

JOHN WESLEY LEE, OF DAYTON, OHIO, ASSIGNOR TO THE INLAND MANUFACTURING COMPANY, OF DAYTON, OHIO, A CORPORATION OF DELAWARE.

HANDWHEEL.

Application filed December 14, 1922, Serial No. 606,931. Renewed May 7, 1925.

This invention relates to handwheels, especially such as are ordinarily employed as steering wheels on motor vehicles and boats or the like.

An object of this invention is to provide a very strong and efficient handwheel of good appearance and yet of such simple design that it can be manufactured cheaply.

It has been heretofore proposed to use a wood rim with a pressed metal spider; however in all such previous designs the spider has been made up of a number of parts which had to be riveted or welded together to form a rigid structure. According to this invention the spider arms are all formed from an integral piece of sheet metal and the hub is rigidly secured to the spider by the sheet metal being firmly pressed against and around certain portions of the hub.

Further objects and advantages of the present invention will be apparent from the following description, reference being had to the accompanying drawings, wherein preferred forms of embodiment of the present invention are clearly shown.

In the drawings:

Fig. 1 is a plan view of a wheel made according to this invention.

Fig. 2 is a section through the center line of Fig. 1 but showing portions of the spokes in elevation.

Fig. 3 is a section on line 3—3 of Fig. 1.

Fig. 4 is a section on line 4—4 of Fig. 1.

Fig. 5 shows the shape of the sheet metal before it is bent down around the hub (shown in dotted lines) to form the spider.

In the drawings, like or similar reference characters refer to like or similar parts throughout the several views.

To form the spider a piece of sheet metal 10 of the shape shown in Fig. 5 is first cut out. A hub 11 is preferably formed of cast metal and is provided with a sleeve portion 14 adapted to fit over a steering column and a flange portion 12 which has a plurality of projections 13 corresponding to the spokes of the spider.

The hub 11 is placed in the relative position shown in Fig. 5 with the sheet metal form 10 and the sheet metal pressed down around the flange portion 12. The sheet metal spokes 16 are folded over to box section, the inner ends of these box sections being folded tightly about the hub projections 13, while the portions 17 are pressed down and tightly against the lateral edges of flange 12 along the concave surfaces 15 (see Fig. 3). The concave surfaces 15 are preferably left unfinished so that when the flanges 17 are pressed tightly thereagainst there will be a stronger grip between the sheet metal and the hub to hold it more securely in place. Of course if desired ridges or grooves or other irregularities could be provided in the surfaces 15 for the same purpose. It will be noted that no rivets or other similar means are necessary to hold the hub securely in place and therefore the central portion of the spider presents a very well finished and neat appearance.

The ends 20 of the spokes 16 are curved back as shown in Fig. 2 to conform to the shape of the rim 21 to which they are secured preferably by wood screws 22. The ends 20 are preferably turned back abruptly so that they abut and are backed up by the flanges of the box section of the spoke 16, thereby giving a more rigid construction.

While the forms of mechanisms herein shown and described, constitute preferred forms of embodiment of the present invention, it is to be understood that other forms might be adopted, all coming within the scope of the claims which follow.

What I claim is as follows:

1. A handwheel spider comprising: a metal hub having a sleeve portion adapted to be secured to a shaft and a star-shaped flange portion at the upper end of said sleeve portion, said flange and sleeve portions having a flat upper face; and a plurality of spider arms integrally formed from a piece of sheet metal, said sheet metal lying flat upon the said upper face of said flange portion and having portions bent down around the star points of said star-shaped flange and having other portions bent down and pressed firmly against the vertical surfaces of the concave portions extending between the star points.

2. A handwheel spider comprising: a metal hub having a sleeve portion adapted to be secured to a shaft and a star-shaped flange at the upper end of said sleeve portion, the side surfaces of adjacent star points flaring into one another in an unbroken curve thereby forming concave web portions extending between adjacent star points, and a one-piece sheet metal stamping overlying said hub and having integral box-section spokes bent up therefrom so that each spoke encloses one of the star points of said hub, said sheet metal having also flanges of substantial width turned downwardly therefrom and ironed up into tight contact with said concave web portions between said spokes whereby said concave web portions are concealed.

In testimony whereof I hereunto affix my signature.

JOHN WESLEY LEE.